Nov. 9, 1954
W. HARRISON
2,693,971
BALL-AND-SOCKET PIPE COUPLING
Filed Oct. 20, 1952
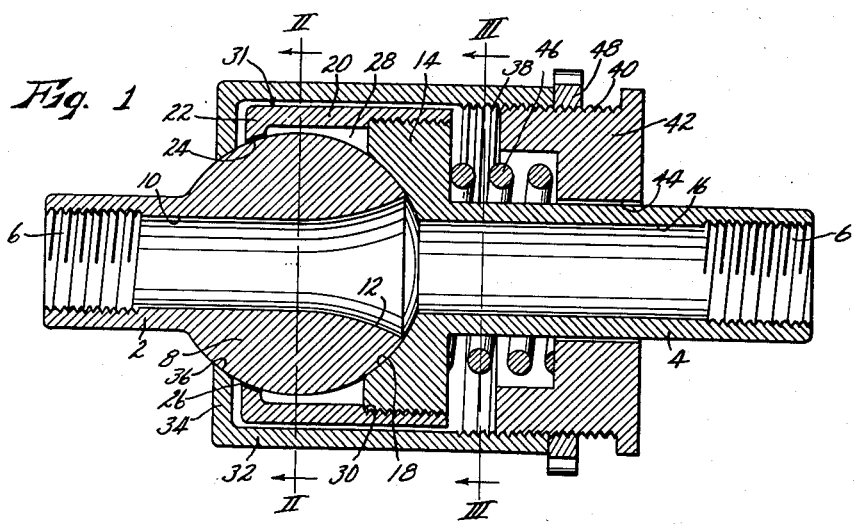
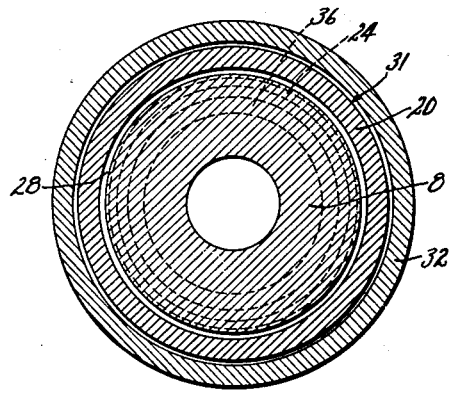
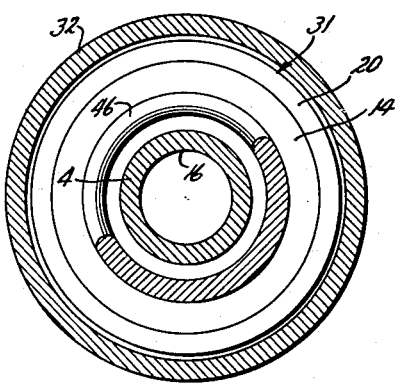
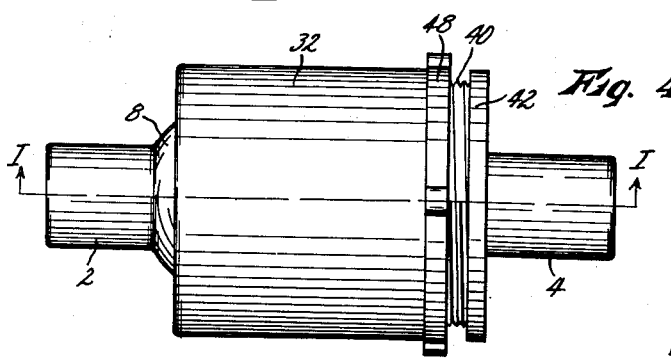
INVENTOR.
Wesley Harrison
BY
Hamilton & Hamilton
Attorneys.

United States Patent Office 2,693,971
Patented Nov. 9, 1954

2,693,971

BALL-AND-SOCKET PIPE COUPLING

Wesley Harrison, Enid, Okla.

Application October 20, 1952, Serial No. 315,705

2 Claims. (Cl. 285—95)

This invention relates to new and useful improvements in pipe couplings, and has particular reference to flexible pipe couplings of the ball-and-socket type.

An important object of the present invention is the provision of a ball-and-socket pipe coupling which, although quite flexible and freely pivotable at all times, and in which the ball member is not clamped rigidly in the socket member, is nevertheless fluid-tight under all pressures, low as well as high.

Another object is the provision of a ball-and socket pipe coupling of the character described which compensates automatically for thermal expansion, both in the parts of the coupling itself and in the pipes or other elements connected thereto, thereby forming a fluid-tight connection under virtually all conditions.

These objects are accomplished generally by the provision of a socket member having opposed seats in either of which the ball member may engage, spring means normally urging the ball into one of said seats, and means whereby the pressure of the fluid contained will urge the ball into the other of said seats.

A further object is the provision, in a coupling of the character above described, of means whereby the movement of the ball from one seat to the other is accomplished with a very rapid "snap" action.

Other objects are simplicity and economy of construction, efficiency and dependability of operation, and adaptability for use wherever a flexible pipe coupling is desired.

With these objects in view, as well as other objects which will appear in the course of the specification, reference will be had to the drawing, wherein:

Fig. 1 is a longitudinal cross-sectional view of a ball-and-socket pipe coupling embodying the present invention, being an enlarged section taken on line I—I of Fig. 4.

Fig. 2 is a sectional view taken on line II—II of Fig. 1.

Fig. 3 is a sectional view taken on line III—III of Fig. 1.

Fig. 4 is an external side elevational view of the coupling.

Like reference numerals apply to similar parts throughout the several views, and the numerals 2 and 4 apply respectively to a pair of tubular, pipe-like members which will hereafter for convenience be designated headpiece 2 and tailpiece 4, and which are shown in axial alignment in Figs. 1 and 4. The distal ends of said members are threaded as at 6, either internally as shown or externally if desired, for connection to pipes, fittings, or the like. Headpiece 2 is provided at its inner end with a spherical ball formation 8, and the bore 10 of said headpiece extends through said ball and is flaringly enlarged at its inner end, as at 12. Tailpiece 4 is provided at its inner end with an enlarged integral cylindrical head 14 coaxial with said tailpiece and of larger diameter than ball 8. The bore 16 of said tailpiece extends through said head, and communicates with a spherically formed seat 18 formed in the inner face of said head. Ball 8 is normally in engagement with seat 18, as shown.

A hollow cylindrical member 20, coaxial with tailpiece 4 and of larger internal diameter than ball 8, is disposed about said ball and head 14, being threadably attached at one end to said head and extending outwardly from said head to a point beyond the center of ball 8. At its outer end said cylinder is provided with an inwardly extending flange 22, the inner edge of which forms a spherically curved seat 24. Both seat 18 and seat 24 have a radius of spherical curvature equal to the radius of ball 8, but are spaced apart axially of the coupling at such a distance that ball *i* fits loosely therebetween. The normal clearance between the ball and seat 24 is indicated at 26. It has been exaggerated somewhat in the drawing for clarity, but actually need only be large enough to permit free swivelling movement of the ball at all times. An annular chamber 28 is formed between ball 8 and cylinder 20, the ends of said chamber being defined by head 14 and flange 22. Cylinder 20 is provided with a shoulder 30 which engages the face of head 14 to seal chamber 28 and to preserve proper spacing between the two seats. When the coupling is assembled, head 14 and cylinder 20 form a unitary composite head designated generally by the number 31, said composite head having a socket formed therein of greater than hemispherical extent, and defined by seats 18 and 24.

A cylindrical body or casing 32, of larger internal diameter than cylinder 20 is disposed coaxially about said cylinder. At one end said body is formed to present an inwardly extending flange 34 disposed adjacent to but spaced outwardly from flange 22 of cylinder 20. The inner edge of flange 34 forms a spherically curved seat 36 which engages ball 8 adjacent seat 24. The opposite end of body 32 extends to the right (as viewed in Fig. 1) beyond the outer face of head 14, and is internally threaded at 38 to engage external threads 40 formed on a cylindrical plug 42, said plug being provided with an axial bore 44 which fits loosely and slidably on tailpiece 4. A compression spring 46 is fitted about said tailpiece, bearing at one end against plug 42 and at its opposite end against the outer face of head 14. Plug 42 may be threaded to a greater or lesser extent into body 32 to adjust the tension of spring 46, and may be clamped by means of a lock nut 48 threaded on threads 40, and which may be turned tightly against the end of the body member.

The operation of the coupling is substantially as follows. When the pressure of the contained fluid is low, spring 46 acts through plug 42 and body 32 to urge ball 8 into seat 18, and away from seat 24, thereby maintaining a seal at seat 18. It is not practical, however, to attempt the use of a spring strong enough to maintain this seal at all pressures likely to be encountered. Such a spring would seriously interfere with the free movement of the ball in the socket, and furthermore no spring within practical reason could resist the thermal expansion and contraction of the attached pipes which might tend to pull the ball out of the socket. Spring 46 is thus proportioned and tensioned only to contain low or moderate pressures.

When the pressure of the contained fluid exceeds the setting of spring 46, ball 8 is forced out of seat 18 against the pressure of the spring, and into seat 24. The seal at seat 24 is positive, not depending on any spring pressure, and will remain fluid tight up to any pressure within the strength limitations of the coupling. Pressure-sealing couplings and spring-pressure sealing couplings are not in themselves new. However, spring-pressure sealing couplings are not satisfactory in high pressure service, and fluid pressure-sealing couplings are not satisfactory in low pressure service, and the combination of the two functions in a single coupling, with provision for alternative use, is believed a patentable improvement.

Also, with the structure shown, the transferral of ball 8 from one seat to the other is accomplished with a very sudden "snap" action, thereby virtually eliminating leakage of the joint during said transferral. With the ball seated in seat 18 as shown in Fig. 1, the force tending to push the ball out of said seat is equal to the internal pressure of the contained fluid multiplied by the area of the maximum diameter of the flared portion 12 of bore 10 of the headpiece. When the ball is forced slightly out of seat 18, fluid under pressure enters chamber 28, and then acts over an area equal to the area of seat 24 at the largest diameter thereof. Since seat 24 is of substantially greater area than flare 12 of bore 10, this results in a sudden increase in the total force urging ball 8 out of seat 18, and the ball is thereby moved very rapidly into seat 24. It is obvious, of course, that the normal clearance 26 at seat 24 should be slight, probably as small as is consistent with free movement of the ball. Conversely, when the ball is engaged in seat 24 and the pressure is reduced, spring 46 will first pull the ball slightly out of the seat. This results in a sudden reduction of the area over which pressure is being exerted by the contained fluid, and the spring will pull the ball very rapidly into seat 18.

When the ball is in engagement with seat 24, thermal expansion and contraction of the parts is compensated for by spring 46. When the ball is in engagement with seat 24, the thermal expansion and contraction of the parts is compensated by the fact that the coupling is inherently disposed in an angle of piping which is resiliently yieldable to some extent.

While I have shown and described a specific embodiment of my invention, it is apparent that many minor modifications of structure and operation could be made without departing from the spirit of the invention as defined by the scope of the appended claims.

What I claim as new and desire to protect by Letters Patent is:

1. A pipe coupling comprising an elongated headpiece having a spherical ball formation at one end thereof and having a tubular bore extending longitudinally therethrough, an elongated tailpiece having a head attached at one end thereof and having a tubular bore extending longitudinally therethrough, said head being hollow and having inner and outer end walls at right angles to the axis of the tailpiece and respectively adjacent the body portion of said tailpiece and distal therefrom, said inner end wall having an inwardly facing seat formed therein surrounding the bore of said tailpiece and said outer end wall having an inwardly facing seat formed therein coaxial with said first-named seat, said head being sealed and imperforate except for said seat openings, said seats being of smaller diameter than said ball formation, said ball formation being positioned within said head between said seats and having a clearance therein, a body member loosely surrounding said head and extending axially in both directions therefrom, said body having an end wall at the end thereof adjacent said headpiece, said end wall being spaced apart from the adjacent end of said head and having a circular aperture formed therein, the walls of said aperture forming a seat slidably engaging said ball, a plug slidably mounted on said tailpiece and secured to said body member, and a compression spring bearing at its respective ends against said plug and said head, whereby said ball formation is urged selectively into sealing engagement with the inner end wall seat by said spring, or into sealing engagement with the outer end wall seat by internal fluid pressure within said coupling.

2. A pipe coupling comprising an elongated headpiece having a spherical ball formation at one end thereof and having a tubular bore extending longitudinally therethrough, an elongated tailpiece having a head attached at one end thereof and having a tubular bore extending longitudinally therethrough, said head being hollow and having inner and outer end walls at right angles to the axis of the tailpiece and respectively adjacent the body portion of said tailpiece and distal therefrom, said inner end wall having an inwardly facing seat formed therein surrounding the bore of said tailpiece and said outer end wall having an inwardly facing seat formed therein coaxial with said first-named seat, said head being sealed and imperforate except for said seat openings, said seats being of smaller diameter than said ball formation, said ball formation being positioned within said head between said seats and having a clearance therein, a body member loosely surrounding said head and extending axially in both directions therefrom, said body having an end wall at the end thereof adjacent said headpiece, said end wall being spaced apart from the adjacent end of said head and having a circular aperture formed therein, the walls of said aperture forming a seat slidably engaging said ball, a plug slidably mounted on said tailpiece for movement longitudinally thereof and adjustably secured to said body member for movement toward and from said head, and a compression spring bearing at its respective ends against said plug and said head, whereby said ball formation is urged selectively into sealing engagement with the inner end wall seat by said spring, or into sealing engagement with the outer end wall seat by internal fluid pressure within said coupling.

References Cited in the file of this patent

UNITED STATES PATENTS

| Number | Name | Date |
|--------|------|------|
| 412,940 | Aldcorn | Oct. 15, 1889 |

FOREIGN PATENTS

| Number | Country | Date |
|--------|---------|------|
| 9,921 | Sweden | Dec. 13, 1897 |